United States Patent
Porzio et al.

(10) Patent No.: US 9,977,603 B2
(45) Date of Patent: May 22, 2018

(54) MEMORY DEVICES FOR DETECTING KNOWN INITIAL STATES AND RELATED METHODS AND ELECTRONIC SYSTEMS

(71) Applicant: Micron Technology, Inc., Boise, ID (US)

(72) Inventors: Luca Porzio, Casalnuovo di Napoli (IT); Graziano Mirichigni, Vimercate (IT); Danilo Caraccio, Buonalbergo (IT)

(73) Assignee: Micron Technology, Inc., Boise, ID (US)

( * ) Notice: Subject to any disclaimer, the term of this patent is extended or adjusted under 35 U.S.C. 154(b) by 11 days.

(21) Appl. No.: 15/144,141

(22) Filed: May 2, 2016

(65) Prior Publication Data

US 2017/0315734 A1    Nov. 2, 2017

(51) Int. Cl.
*G06F 3/06* (2006.01)
*G06F 9/44* (2018.01)

(52) U.S. Cl.
CPC .......... *G06F 3/0611* (2013.01); *G06F 3/0625* (2013.01); *G06F 3/0634* (2013.01); *G06F 3/0659* (2013.01); *G06F 3/0688* (2013.01); *G06F 9/4401* (2013.01)

(58) Field of Classification Search
CPC ..................................................... G06F 3/0625
See application file for complete search history.

(56) References Cited

U.S. PATENT DOCUMENTS

| | | | |
|---|---|---|---|
| 8,307,151 B1 | 11/2012 | Caraccio et al. | |
| 2009/0222639 A1* | 9/2009 | Hyvonen | G06F 12/1458 711/170 |
| 2014/0201473 A1 | 7/2014 | Falanga et al. | |
| 2015/0212738 A1 | 7/2015 | D'Eliseo et al. | |

* cited by examiner

*Primary Examiner* — Edward J Dudek, Jr.
(74) *Attorney, Agent, or Firm* — TraskBritt

(57) ABSTRACT

A memory device includes a memory array having non-volatile memory cells, and a memory controller configured to detect a known state to enter based, at least in part, on communication with a host device, and reconfigure the memory device to prepare for the known state. A host controller is configured to communicate with the memory device to support a feature and protocol for detecting the known state for operation of the memory device. Related methods and systems are also disclosed.

23 Claims, 13 Drawing Sheets

| REGISTER (E.G. EXT_CSD BYTE) | BIT | FIELD | TYPE | VALUE | DESCRIPTION |
|---|---|---|---|---|---|
| KISS_CAPABILITY | [7:6] | RESERVED | - | RESERVED | - |
| | [5] | LEARNING_MODE | R | 0b | NOT SUPPORTED |
| | | | | 1b | SUPPORTED |
| | [4] | PUSHING_MODE | R | 0b | NOT SUPPORTED |
| | | | | 1b | SUPPORTED |
| | [3:0] | STATES_SUPPORT | R | N | NUMBER OF STATES SUPPORTED WITH N = 0 - 15 STATES N = 0 MEANS FEATURE NOT SUPPORTED |

| REGISTER (E.G. EXT_CSD BYTE) | BIT | FIELD | TYPE | VALUE | DESCRIPTION |
|---|---|---|---|---|---|
| KISS_EXECUTION | [7] | RESERVED | - | RESERVED | - |
| | [6:4] | OPERATION | R/W | 000b | STOP EXECUTION OF ANY PHASE (LEARNING, PUSHING OR PULLING) |
| | | | | 001b | START EXECUTION OF LEARNING PHASE |
| | | | | 010b | START EXECUTION OF PUSHING PHASE |
| | | | | 011b | START EXECUTION OF PULLING PHASE |
| | | | | 100b | RESERVED |
| | | | | 101b | SET HINT STATE |
| | | | | 110b | SET STATE |
| | | | | 111b | RESET STATE |
| | [3:0] | STATE_SELECT | R/W | N | OPERATION ON STATE N. N = 0 MEANS NO STATE SELECTED |

FIG. 6

MEMORY DEVICES FOR DETECTING KNOWN INITIAL STATES AND RELATED METHODS AND ELECTRONIC SYSTEMS

TECHNICAL FIELD

The disclosure, in various embodiments, relates generally to the field of memory device management. More specifically, the disclosure relates to memory devices including memory controllers and/or host controllers configured to detect known initial states for the memory devices and to related methods and electronic systems.

BACKGROUND

Memory devices are typically provided as integrated circuits for storage in computers or other electronic devices. There are many different types of memory including random-access memory (RAM), read-only memory (ROM), dynamic random-access memory (DRAM), synchronous dynamic random-access memory (SDRAM), and non-volatile memory (e.g., flash). Flash memory devices have developed into a popular source of non-volatile memory for a wide range of electronic applications due to its low power consumption and superior performance. Flash memory devices typically use a one-transistor memory cell that allows for high memory densities, high reliability, and low power consumption. Changes in threshold voltage of the cells, through programming of a charge storage structure, such as floating gates, trapping layers or other physical phenomena, determine the data state of each cell. Common uses for flash memory include personal computers, personal digital assistants (PDAs), digital cameras, digital media players, digital recorders, games, appliances, vehicles, wireless devices, cellular telephones, and removable memory modules.

The operation of electronic devices (e.g., the user experience in consumer electronic devices) may be negatively impacted by IO congestions and eventually performance bottlenecks on the memory devices. Current industry trends for solutions to this problem tend to be focused on raw performance improvements to the memory device itself (e.g., faster NAND cells, faster protocols, more RAM resources) or to the overall system, which can lead to a higher cost structure in exchange for improved performance.

BRIEF DESCRIPTION OF THE DRAWINGS

FIGS. 5 through 7 are tables illustrating an organization of memory device registers according to embodiments of the present disclosure.

DETAILED DESCRIPTION

Figure 1:
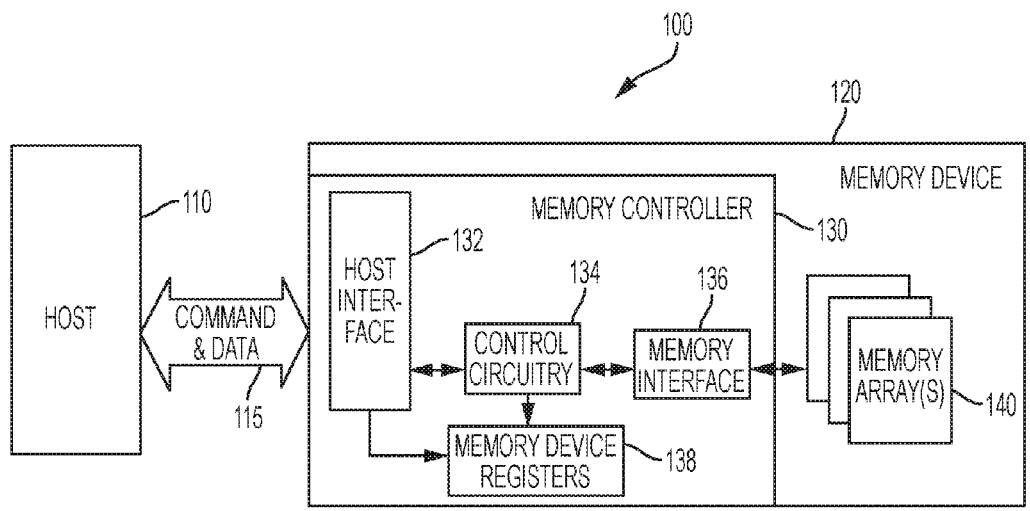
FIG. 1 is a schematic block diagram of an electronic system including a host operably coupled with a memory device according to an embodiment of the present disclosure.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "and/or" includes any and all combinations of one or more of the associated listed items.

As used herein, the term "configured" refers to a size, shape, material composition, and arrangement of one or more of at least one structure and at least one apparatus facilitating operation of one or more of the structure and the apparatus in a pre-determined way.

As used herein, the phrases "coupled to" or "coupled with" refer to structures operatively connected with each other, such as electrically connected through a direct ohmic connection or through an indirect connection (e.g., via another structure).

Embodiments of the present disclosure include host devices and/or memory devices that are configured to support a Known Initial Selectable State (KISS) feature. As used herein, the terms "KISS feature," "KISS functionality" or the like refer to operations performed by the host device and/or the memory device to predict a next state for the memory device, and prepare (e.g., reconfigure) the memory device responsive to the predicted next state.

FIG. 1 is a schematic block diagram of an electronic system 100 including a host 110 operably coupled with a memory device 120 according to an embodiment of the present disclosure. The host 110 may be an external host (e.g., a microprocessor of a larger system) that also acts as a controller for the memory device 120. For example, the host 110 may include a host controller configured to communicate commands (e.g., write, read, erase, etc.) and data with the memory device 120 over a command and data bus 115.

The memory device 120 may include a memory controller 130 that is operably coupled with one or more memory arrays 140. The memory arrays 140 may include memory cells that may be arranged in banks of word line rows and bit line columns. In some embodiments, the columns of the memory array 140 comprise series strings of memory cells. As non-limiting example, the memory arrays 140 may be configured as non-volatile memory, such as NAND Flash, NOR Flash, erasable programmable read-only memory (EPROM), electrically erasable programmable read-only memory (EEPROM), ferroelectric RAM (FRAM), magnetoresistive RAM (MRAM) or other suitable non-volatile memory technology or any combination thereof. The memory device 120 may be incorporated within an embedded multi-media controller (also referred to as "embedded MMC" or "eMMC"), Solid State Drives (SSD), Universal Flash Storage (UFS) devices, and/or other devices that utilize non-volatile memory as discussed herein.

The memory controller 130 may include host interface circuitry 132, control circuitry 134, memory interface circuitry 136, and memory device registers 138. These elements are examples of what may be present within a memory controller 130; however, it should be understood that some embodiments may include only a subset of these elements and/or additional memory device circuitry. The memory controller 130 may be configured to support a KISS functionality as well as a KISS protocol for communicating between the host 110 and the memory device 120. In some embodiments, the known states may be stored in one or more of the memory device registers 138, and the memory controller 130 may detect when the memory device 120 will enter one of the known states and build the memory device 120 to prepare for the detected known state. In other words, the memory controller 130 may analyze and characterize predictable behavior in the commands and/or data from the host 110 and adapt the memory device 120 accordingly to prepare to enter that known state.

The host interface circuitry 132 may be configured to provide an interface between the memory device 120 and the host 110, such as through buffers, registers, etc. The control circuitry 134 may be configured to control the operations of the memory array(s) 140, sometimes in response to commands from the host 110 such as by performing data sense operations (e.g., read), data program operations (e.g., write), and data erase operations. The control circuitry 134 may include a state machine, a sequencer, and/or another type of control circuitry that is configured to generate control signals that control the memory arrays 140. The memory interface circuitry 136 may be configured to provide bidirectional data communication between the control circuitry 134 and the memory arrays 140. The memory interface circuitry 136 may include write circuitry, read circuitry, decoders, buffers, etc. The memory device registers 138 may be configured to store control data for various operations performed by the memory controller 130. The memory device registers 138 may be incorporated within the control circuitry 134 or separate from the control circuitry 134 in some embodiments.

The memory device registers 138 may store information that is used with respect to the KISS functionality described herein. For example, a KISS capabilities register (see FIG. 5) that may be used to determine the capabilities of the memory device 120, the KISS execution register (see FIG. 6) that may be configured to execute various operations of the KISS functionality, and the KISS current state register (see FIG. 7) that may be configured to inform the host 110 what are the current set state and the hint state for the memory device 120. In some embodiments, the memory device registers 138 may be implemented as different registers, whereas in other embodiments the memory device registers 138 may be implemented as different register bits in one register. Each of these registers will be described below in further detail. Additional registers may also be included to perform additional functions for the memory device 120. In some embodiments, at least some of the memory device registers 138 may be configured as read/write capable. In some embodiments, the memory device registers 138 may be configured to be read only registers.

Thus, embodiments of the present disclosure include the memory device 120 comprising a memory array 140 having non-volatile memory cells, and a memory controller 130 operably coupled to the memory array 140. The memory controller 130 is configured to detect a known state to enter based, at least in part, on communication with a host 110, and reconfigure the memory device to prepare for the known state. Similarly, the host device 110 may comprise a host controller configured to communicate with a memory device 120 to support a feature and protocol for detecting a known state for operation of the memory device 120 and reconfiguring the memory device 120 to prepare for operations prior to the memory device entering the known state.

In some embodiments, a method for managing operation of a memory device 120 is described. The method comprises receiving communication over a command and data bus 115 from a host device 110, determining a known state for the memory device 120 responsive to the communication, and reconfiguring the memory device 120 according to the known state prior to receiving individual commands from the host device 110.

Figure 2:
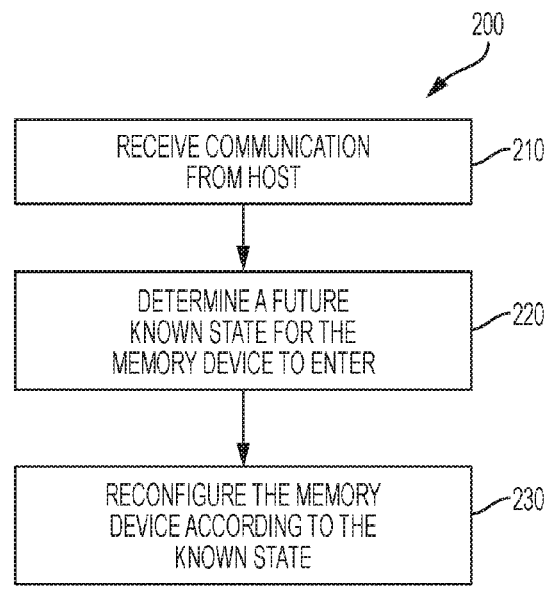
FIG. 2 is a flowchart illustrating a method of operating a memory device according to an embodiment of the disclosure.

FIG. 2 is a flowchart 200 illustrating a method of operating a memory device 120 according to an embodiment of the disclosure. The memory device 120 may be configured to support a KISS functionality and a corresponding communication protocol with the host 110.

At operation 210, the memory device 120 may receive communication from the host 110. Such communication may include commands and/or data transmitted over the command and data bus 115.

At operation 220, a future known state for the memory device 120 to enter may be determined based, at least in part, on the communication. In some embodiments, the future known state may be determined by the host 110 with the future known state sent as a command from the host 110 to the memory device 120 to enter the future known state. In some embodiments, the memory device 120 may predict the known state based on analyzing the communication traffic and recognizing patterns used to derive the future known state. Examples of traffic analysis include detecting peaks of IO accesses triggered by a given precise and repeatable user operation (e.g., a button press, a timer expiration, etc.), detecting repetitive IO access patterns onto the memory device 120 (e.g., an application accessing the memory device 120 always using the same pattern), and/or detecting predictable peak instants (e.g., the application may be detected and known to write a precise amount of data).

At operation 230, the memory device 120 is configured according to the known state detected. For example, the memory device 120 may perform a series of steps to "build" a detected internal state for the memory device 120, such as by preloading tables and information into internal RAM memories, aggregating data to improve the use of memory device's 120 internal parallelism, enabling and/or disabling internal circuitry of the memory controller 130 and/or the memory array 140, presetting internal microcontroller registers, clearing space in the memory array 140 to receive expected data during operations of the determined known state.

Figure 3:
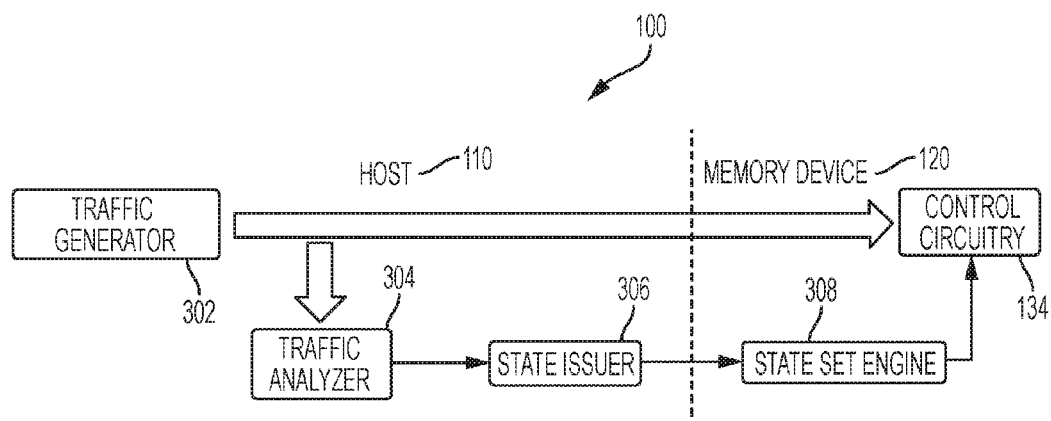
FIGS. 3 and 4 are functional block diagrams that illustrate different approaches to determining which known state the memory device will enter.
Figure 4:
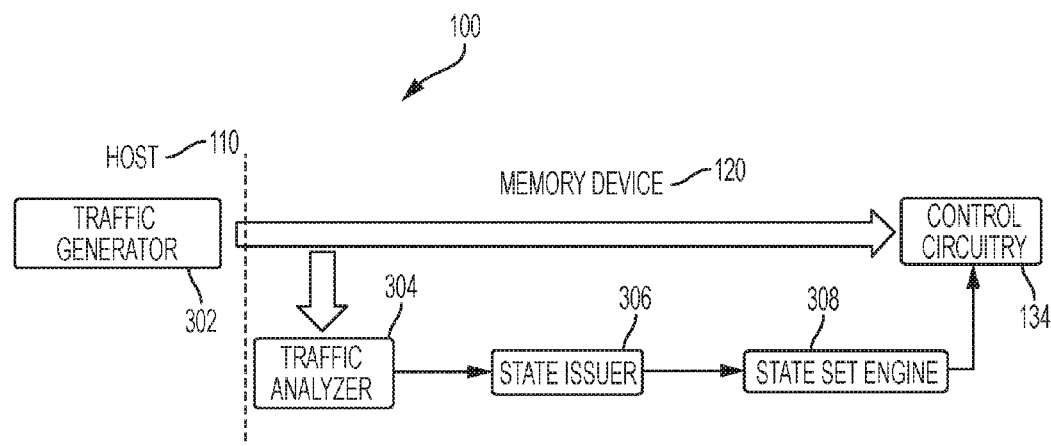

FIGS. 3 and 4 are functional block diagrams that illustrate different approaches to determining which known state the memory device 120 will enter. In particular, FIG. 3 illustrates an explicit request in which the host 110 determines which of the known states will be entered by the memory device 120. For example, the host 110 may send a command to the memory device 120 informing the memory device 120 of the desired known state. FIG. 4, on the other hand, illustrates an implicit request in which the memory device 120 determines which of the known states will be entered by the memory device 120. For example, the memory device

120 may monitor traffic on the command and data bus 115 to recognize triggers (e.g., particular instances or patterns of commands and/or data, etc.). In some embodiments, it is contemplated at least part of the determination for the known state may occur on either or both sides.

Referring specifically to FIG. 3, the host 110 may include a traffic generator 302, a traffic analyzer 304, and a state issuer 306 that are configured to generate an explicit request for the memory device 120 to enter a given known state. The explicit request may include the host 110 sending a specific command (e.g., via state issuer 306) to the memory device 120 to let the memory device 120 know which of the selectable known states the memory device 120 will enter. The memory device 120 may receive the command, and the memory device 120 may prepare itself to enter the known state.

As an example, the host 110 may detect a user input to boot up the electronic system. The host 110 may be configured to know that a "boot state" is a known state supported by the memory device 120. The host 110 may send an explicit command to the memory device 120 instructing the memory device 120 to enter into the boot state even before boot up occurs. As an example, the memory device 120 may reconfigure itself to prepare for known boot up operations (e.g., internal data may be organized, data structures may be prepared, etc.) before these individual boot up operations are executed. As another example, the host 110 may detect a user input to open a particular application (e.g., a camera application). The host 110 may know that a "camera state" is a known state supported by the memory device 120. The host 110 may send an explicit command to the memory device 120 instructing the memory device 120 to enter into the camera state even before camera operations occur (e.g., photo saving). As an example, the memory device 120 may reconfigure itself to prepare for known camera operations before these individual camera operations are executed. For example, the memory device 120 may know a size for an image file and begin to prepare space within the memory arrays to save the image file even before the image is taken or individual commands are sent to write the data to save the image. Other states are also contemplated.

Referring specifically to FIG. 4, the memory device 120 may include the traffic analyzer 304, the state issuer 306, and the state set engine 308 that are configured to generate an implicit request for the memory device 120. The implicit request may include the host 110 sending traffic (e.g., commands and data) to the memory device 120 from which the memory device 120 may determine which of the selectable known states the memory device 120 will enter. The memory device 120 may receive the traffic, analyze the traffic, and determine the future known state. As a result, the memory device 120 may prepare itself to enter the known state even without receiving an explicit command from the host 110 to enter into the given state.

As an example, the host 110 may begin to send traffic for the memory device 120 to boot up the electronic system. While analyzing this traffic, the memory device 120 may recognize certain commands, data, patterns and/or operational parameters (e.g., voltage values) that are unique to a boot up in comparison to other types of operations. The memory device 120 may recognize that these unique characteristics correspond to a known "boot state" supported by the memory device 120. The memory device 120 may enter into the boot state to prepare for future operations even before they occur. As another example, the memory device 120 may begin to receive traffic from the host 110 corresponding to a camera application. While analyzing this traffic, the memory device 120 may recognize certain commands, data, patterns and/or operational parameters that are unique to the camera application in comparison to other types of operations. The memory device 120 may enter into the camera state to prepare for future operations even before they occur.

Figure 5:
Figure 7:
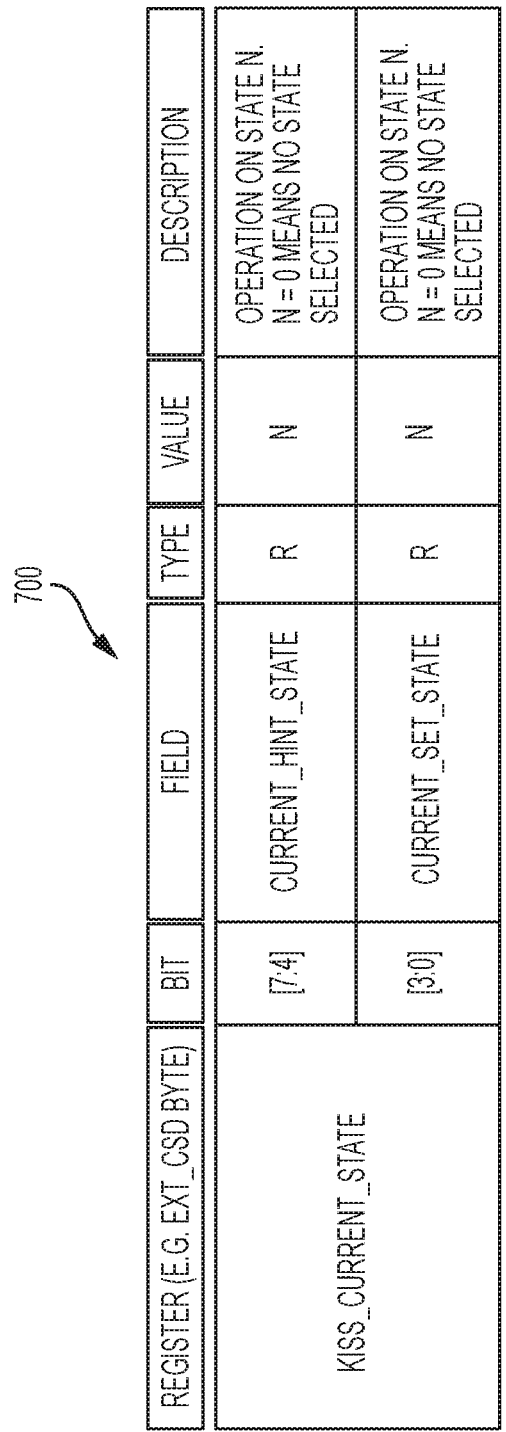

FIGS. 5 through 7 are tables 500 through 700 illustrating an organization of memory device registers according to embodiments of the present disclosure. In particular, the registers represented by tables 500 through 700 may be included within the memory device registers 138 of FIG. 1. These tables 500 through 700 may be maintained as one or more bitmaps by the memory device registers.

Referring specifically to FIG. 5, table 500 represents a KISS capability register that is configured to define the capabilities of the memory device 120 with regard to whether the memory device 120 supports the KISS functionality, the number of known states supported, the definitions for these supported known states, as well as other capabilities of the memory device 120 (e.g., whether learning mode and/or pushing mode are supported). Learning mode and pushing mode may be used to create a state to be known and supported by the memory device 120. During a learning mode, the memory device may monitor command traffic during a learning phase to detect certain patterns and other correlations that are unique to a given state. During a pushing mode, the memory device may be specifically instructed what characteristics or other features to look for when attempting to identify a known state. Thus, new known states may be created.

As shown in table 500, the KISS capability register may include bits (e.g., bits 3:0) as state support bits that are used to define how many known states are supported by the KISS capability register. The maximum number of known states supported by the memory device 120 may depend on the number of bits used in the KISS capability register for this purpose. For example, FIG. 5 shows four bits may be used to define the known states, which may include a maximum of sixteen different known states supported by the memory device 120. In some embodiments, one or more of these combination of bits may be used to indicate whether the KISS functionality is supported, such that a number of known states may be supported by the memory device 120 that is fewer than the theoretical maximum. For example, the state bits may be defined such that when N=0, the KISS functionality may not be supported and/or disabled.

Additional bits may be used to determine additional features supported by the memory device 120. For example, mode bits (e.g., bits 4, 5) may be used to define different modes that are supported by the memory device 120. For example, a first mode bit (e.g., bit 4) may be set to define whether the memory device 120 may be operable in pushing mode (e.g., bit 4 set to 0 or 1), while a second bit (e.g., bit 5) may be set to define whether the memory device 120 may be operable in a learning mode (e.g., bit 5 set to 0 or 1). In push mode, the memory device 120 may be configured to develop a new state by an external entity (e.g., vendor specific states). In learning mode, the memory device 120 may be configured to automatically learn a state based on a recognized pattern of commands (e.g., auto-learning algorithms may detect a received pattern). In some embodiments, the memory device 120 may support pushing mode only, learning mode only, or both pushing mode and learning mode. Because of the additional computational complexity of learning mode, memory devices 120 that are configured to develop new states by supporting learning mode may typically be high end devices, whereas the memory devices that are configured to develop new states by only supporting push mode may typically be low end devices. In some embodiments, the memory device 120 may be able to support both learning mode and push mode. Additional bits (e.g., bits 7:6) may be reserved for additional features of the memory device 120. Such bits may be used to define additional custom states, such as by the vendor that implements the memory device 120 in their electronic system.

Referring specifically to FIG. 6, table 600 represents a KISS execution register that is configured to define the operations that are executable by the memory device 120. The state select bits (e.g., bits 3:0) may be used to define which state is selected when an operation is to be performed. The operation bits (e.g., bits 6:4) may be used to define the different operations that may be executed by the memory device 120. For example, operations may include a command to start execution of a particular phase (e.g., learning phase, pushing phase, pulling phase), stop execution of a particular phase, setting a state, resetting a state, setting a hint state, and so on. Some operations may be defined in the memory device 120 at manufacturing, while other operations may be user defined (e.g., reserved operations for customization).

Referring specifically to FIG. 7, table 700 represents a KISS current state register that is configured to inform the host which known state is the current state for the memory device 120 and/or which known state is the current hint state for the memory device 120. For example, the host 110 and/or memory device 120 may send a request to the KISS current state register for this information, and the KISS current state register may return the combination of bits (e.g., on bits 3:0) that define the current state or the combination of bits (e.g., on bits 7:4) that define the current hint state.

FIGS. 8 through 14 are sequence diagrams 800 through 1400 illustrating various command sequences that may be performed between the host and the memory device to implement the methods according to embodiments of the disclosure. These command sequences may be implemented according to a variety of different communication protocols supported by the host and the memory device. In some embodiments, different protocols may be used depending on the system in which the host and the memory device are implemented. For example, the communication protocol for an eMMC device may be different than the protocol for a UFS device or other devices. Thus, the specific commands that may be used to implement these requests may depend on the particular protocol that is employed.

Figure 8:
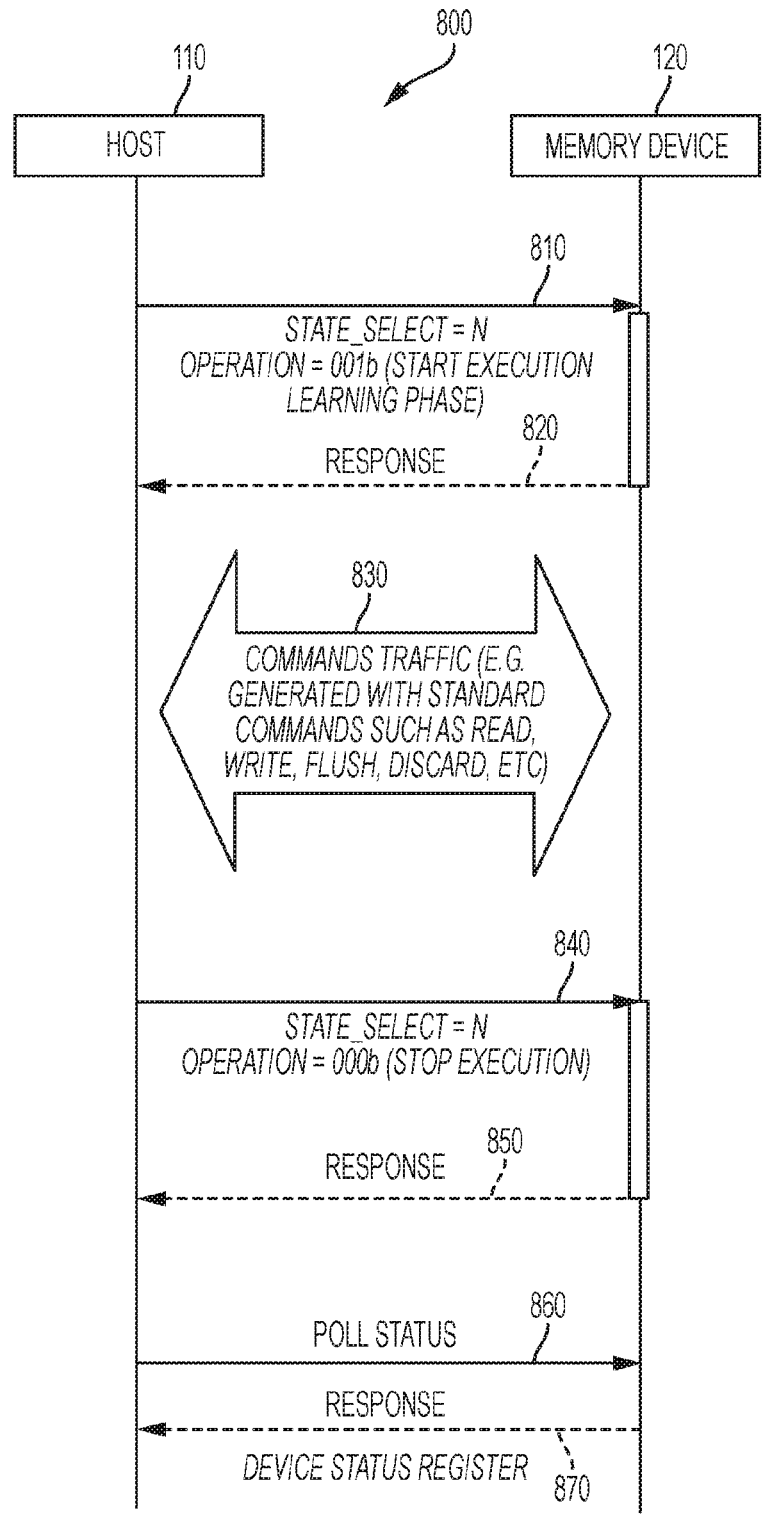
FIGS. 8 through 14 are sequence diagrams illustrating various command sequences that may be performed between the host and the memory device to implement the methods according to embodiments of the disclosure.

Referring specifically to FIG. 8, a new state may be created through a learning phase supported by the memory device 120. The result of creating a new state is that the memory device 120 will have an additional "known state" that may be recognizable or otherwise supported during subsequent operation.

At operation 810, the host 110 may send a start execution command to the memory device 120. The start execution command may include a start execution operation code (e.g., operation bits=001) and a state select code (e.g., state select=N, where N is the state being created). For example, if a new state is being created for N=11, the state select bits may be set at 1011. At operation 820, the memory device 120 may send an acknowledgement response indicating that the memory device 120 received the start execution command for the new state and is ready to receive traffic from the host 110.

At operation 830, the host 110 and the memory device 120 may exchange command traffic for that particular state. During this time, the memory device 120 may monitor the traffic in order to record the commands for future use—particularly the unique commands, patterns, etc. were used during operation of that state.

At operation 840, the host 110 may send a stop execution command to the memory device 120. The stop execution command may include a stop execution operation code (e.g., operation bits=000) and a state select code (e.g., state select=N, where N is the state being created). At operation 850, the memory device 120 may send an acknowledgement response indicating that the memory device 120 received the stop execution command.

At operation 860, the host 110 may desire to poll the status of the created state to ensure that the state creation has been successfully completed. At operation 870, the memory device 120 may send an acknowledgement response indicating that the memory device 120 received the status check command along with any requested information. This information may be retrieved from the device status register.

Figure 9:
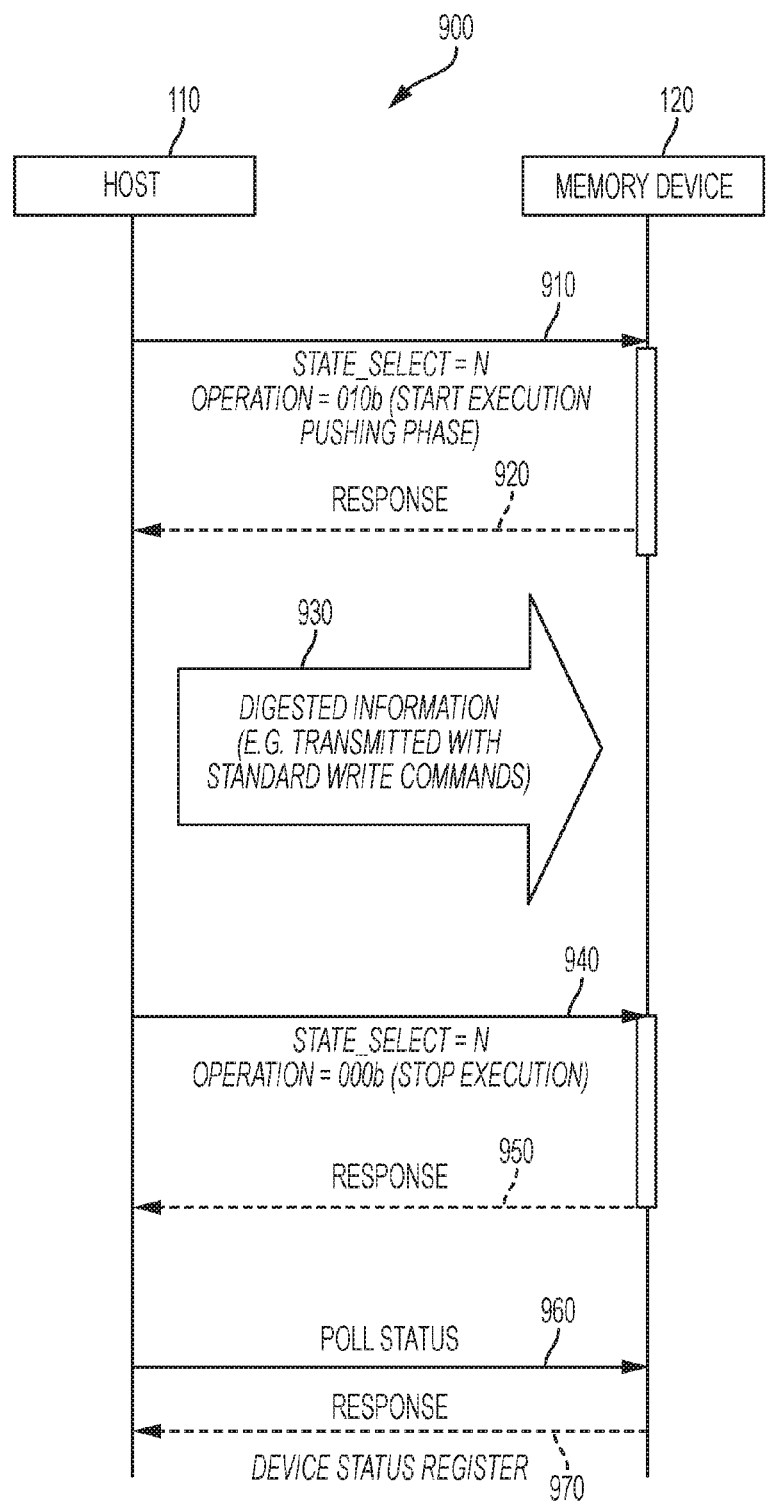

Referring specifically to FIG. 9, a new state may be created through a pushing phase supported by the memory device 120. The result of creating a new state is that the memory device 120 will have an additional "known state" that may be recognizable or otherwise supported during subsequent operation.

At operation 910, the host 110 may send a start execution command to the memory device 120. The start execution command may include a start execution operation code (e.g., operation bits=010) and a state select code (e.g., state select=N, where N is the state being created). For example, if a new state is being created for N=11, the state select bits may be set at 1011. At operation 920, the memory device 120 may send an acknowledgement response indicating that the memory device 120 received the start execution command for the new state and is ready to receive traffic from the host 110.

At operation 930, the host 110 may send digested information to the memory device 120 for that particular state. This is information that the host 110 may have determined to be particularly unique in terms of the commands, patterns, etc. that are used during operation of that state. Thus, the memory device 120 may not need to monitor traffic for a particular operation to create a new state to be supported by the memory device 120 in such a pushing phase.

At operation 940, the host 110 may send a stop execution command to the memory device 120. The stop execution command may include a stop execution operation code (e.g., operation bits=000) and a state select code (e.g., state select=N, where N is the state being created). At operation 950, the memory device 120 may send an acknowledgement response indicating that the memory device 120 received the stop execution command.

At operation 960, the host 110 may desire to poll the status of the created state to ensure that the new state was created. At operation 970, the memory device 120 may send an acknowledgement response indicating that the memory device 120 received the status check command along with any requested information. This information may be retrieved from the device status register.

With regard to the methods of FIGS. 8 and 9, it is recognized that some memory devices may support creating new states by only a learning phase (FIG. 8) or a pushing phase (FIG. 9), whereas some embodiments may include memory devices 120 that are configured to create new states either a learning phase or a pushing phase, as desired for the particular state to be created. In addition, it is recognized that some vendors may create a new state for a first instance by a learning phase using a first memory device 120 to gather the corresponding information for that state. Subsequently, the vendor may mass produce memory devices and load such memory devices with the known states using pushing phases for the large group of memory devices given that that the information had been previously learned.

Figure 10:
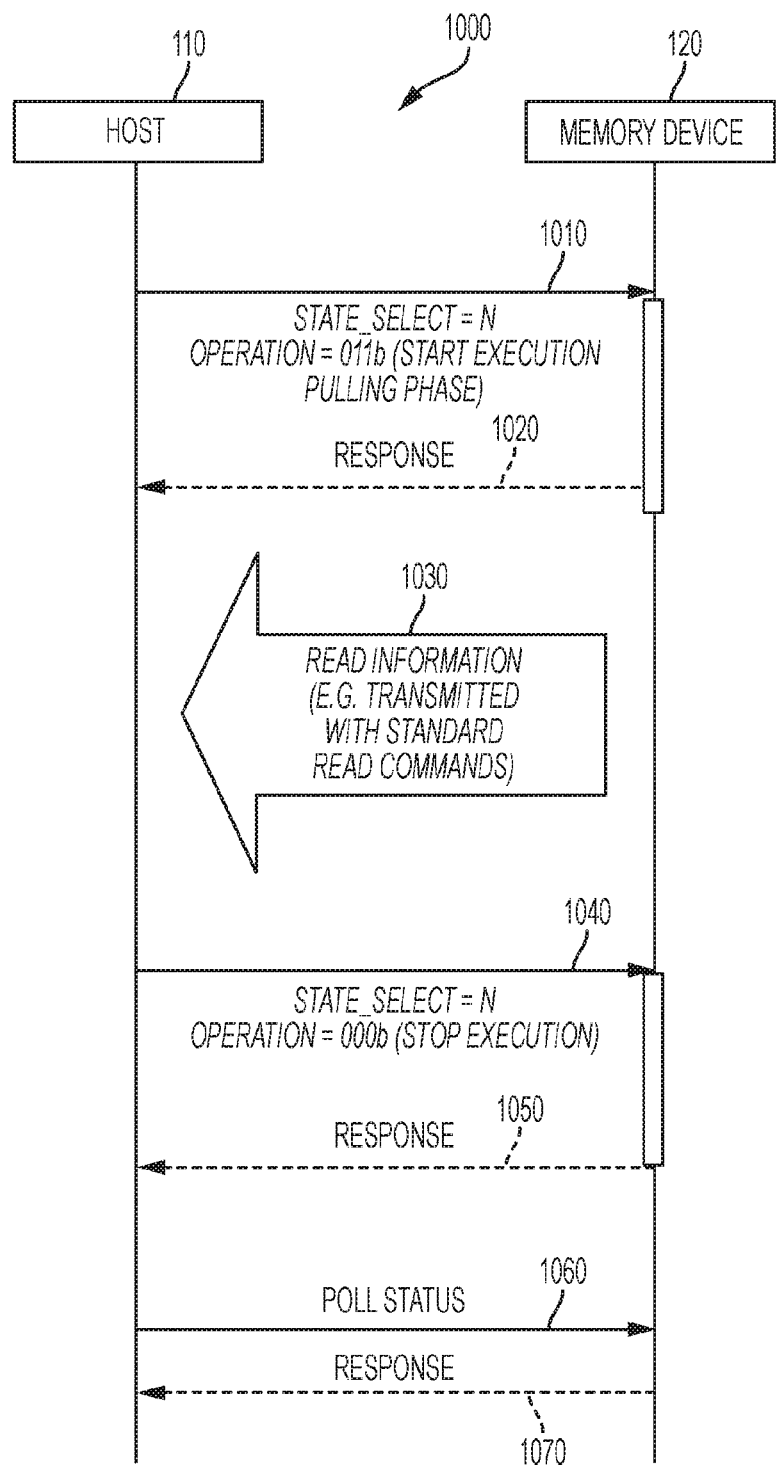

Referring specifically to FIG. 10, state information may be pulled from the memory device 120. In some embodiments, such information may be pulled by the host 110 and then re-used (e.g., pushed) to other memory devices 120.

At operation 1010, the host 110 may send a start execution command to the memory device 120. The start execution command may include a start execution operation code for a read operation (e.g., operation bits=010) and a state select code (e.g., state select=N, where N is the state being read). At operation 1020, the memory device 120 may send an acknowledgement response indicating that the memory device 120 received the start execution command for the read state and is ready to send the requested information to the host 110.

At operation 1030, the memory device 120 may send the requested read information to the host 110 for that particular state. This is information that may be saved by the memory device 120 that is particularly unique in terms of the commands, patterns, etc. that are used during operation of that stored known state.

At operation 1040, the host 110 may send a stop execution command to the memory device 120. The stop execution command may include a stop execution operation code (e.g., operation bits=000) and a state select code (e.g., state select=N, where N is the state being read). At operation 1050, the memory device 120 may send an acknowledgement response indicating that the memory device 120 received the stop execution command.

At operation 1060, the host 110 may desire to poll the status of the read state. At operation 1070, the memory device 120 may send an acknowledgement response indicating that the memory device 120 received the status check command along with any requested information.

Figure 11:
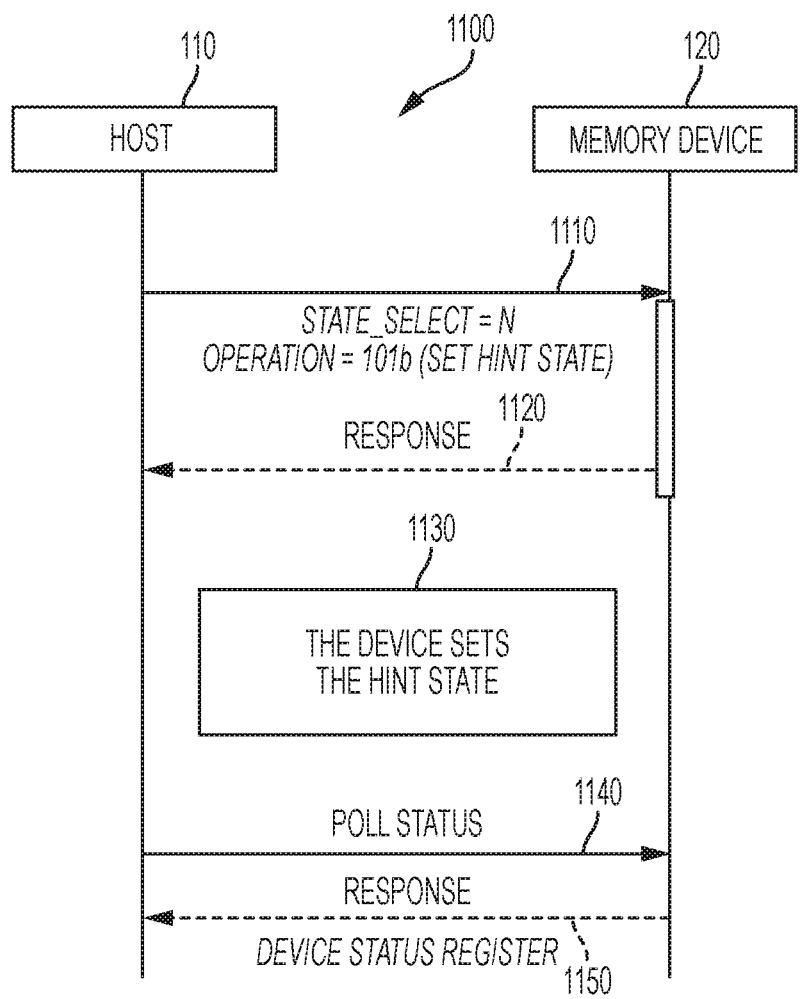

Referring specifically to FIG. 11, hint state information may set to the memory device 120. The "hint state" may be set. As used herein, the hint state may be a known state that is linked to another state. For example, in some embodiments, some known states may be regularly followed by another known state. As a result, the memory device 120 may reconfigure itself for the hint state after the operations for the first state are completed.

At operation 1110, the host 110 may send a set state command to the memory device 120. The set state command may include a operation code for a set hint state operation (e.g., operation bits=100) and a state select code (e.g., state select=N, where N is the state being set with a hint state). At operation 1120, the memory device 120 may send an acknowledgement response indicating that the memory device 120 received the start execution command for the set state operation and is ready to perform the operation.

At operation 1130, the memory device 120 may set a hint state associated with the selected known state. This is information that may be saved by the memory device 120. At operation 1140, the host 110 may desire to poll the status of the known state. At operation 1150, the memory device 120 may send an acknowledgement response indicating that the memory device 120 received the status check command along with any requested information.

Figure 12:
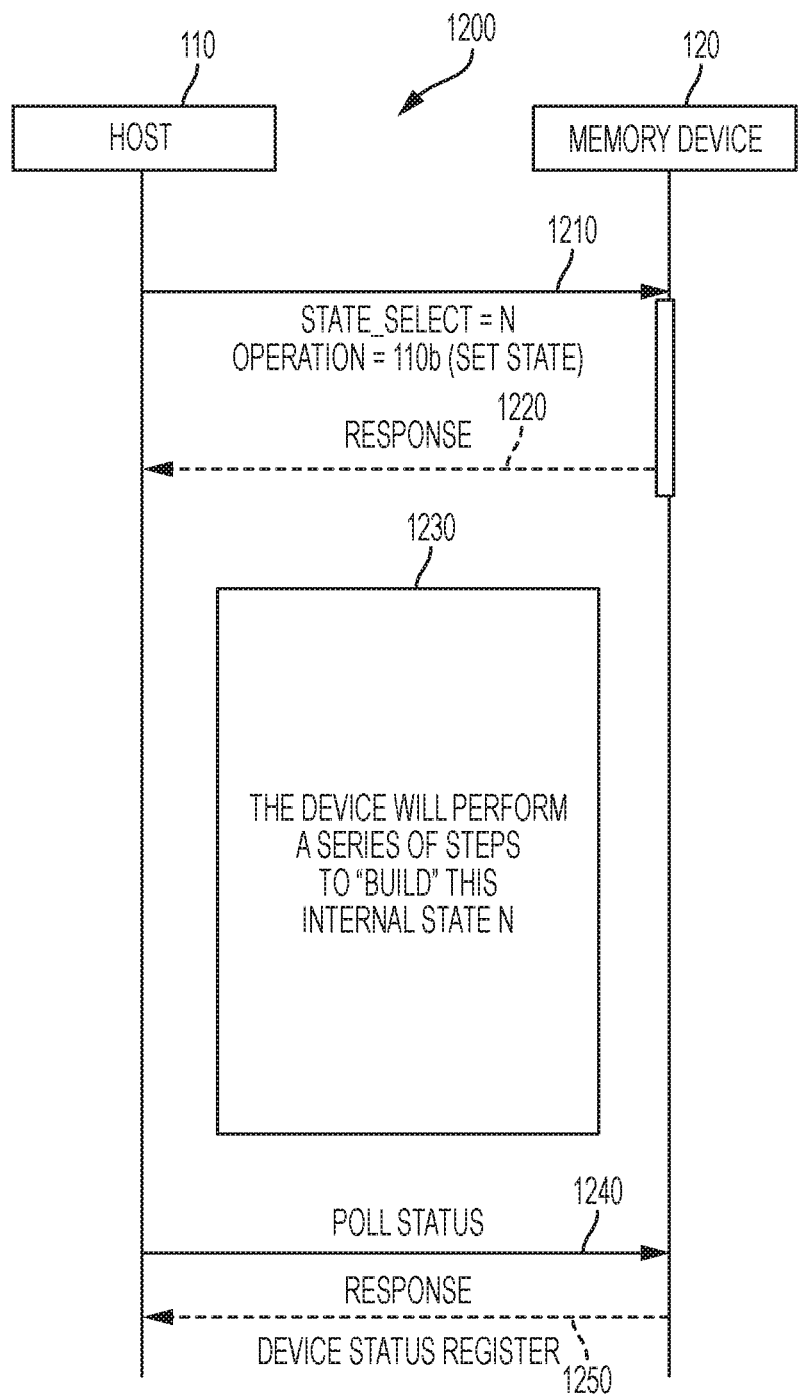

Referring specifically to FIG. 12, the sequence for reconfiguring the memory device 120 according to the known state is described. At operation 1210, the host 110 may send a set state command to the memory device 120. The set state command may include a operation code for a set state operation (e.g., operation bits=100) and a state select code (e.g., state select=N, where N is the state being set). At operation 1220, the memory device 120 may send an acknowledgement response indicating that the memory device 120 received the start execution command for the set state operation and is ready to perform the operation.

At operation 1230, the memory device 120 may build (e.g., reconfigure) the memory device 120 according to the selected known state in order to improve performance of the memory device 120 when the memory device 120 determines it is about to be operated in a known state that is supported by the memory device 120. At operation 1240, the host 110 may desire to poll the status of the known state. At operation 1250, the memory device 120 may send an acknowledgement response indicating that the memory device 120 received the status check command along with any requested information.

Figure 13:
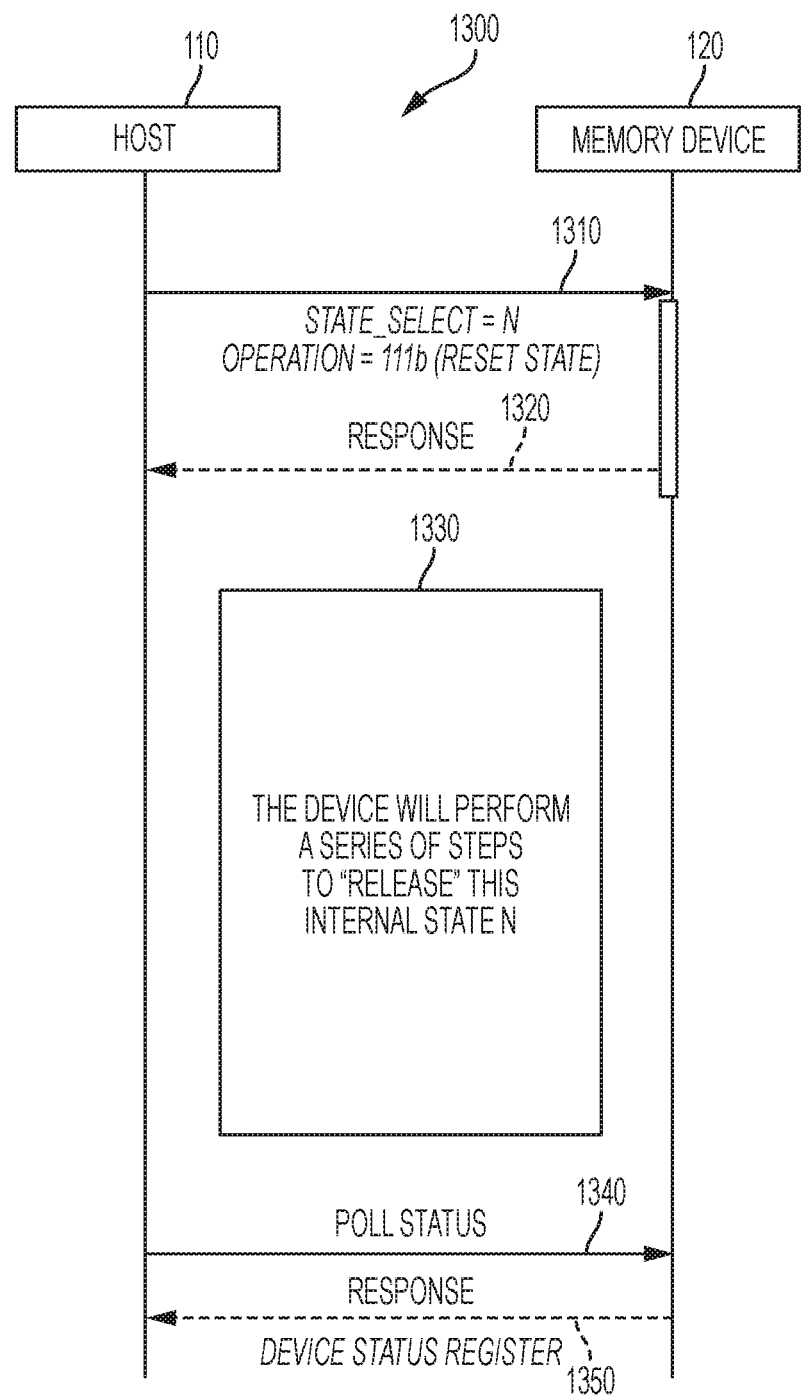

Referring specifically to FIG. 13, the sequence for resetting a known state is described. At operation 1310, the host 110 may send a reset state command to the memory device 120. The reset state command may include a operation code for a reset state operation (e.g., operation bits=111) and a state select code (e.g., state select=N, where N is the state being reset). At operation 1320, the memory device 120 may send an acknowledgement response indicating that the memory device 120 received the start execution command for the reset state operation and is ready to perform the operation.

At operation 1330, the memory device 120 may reset the state associated with the selected known state. At operation 1340, the host 110 may desire to poll the status of the reset state. At operation 1350, the memory device 120 may send an acknowledgement response indicating that the memory device 120 received the status check command along with any requested information that indicates that the previously known state is now reset.

Figure 14:
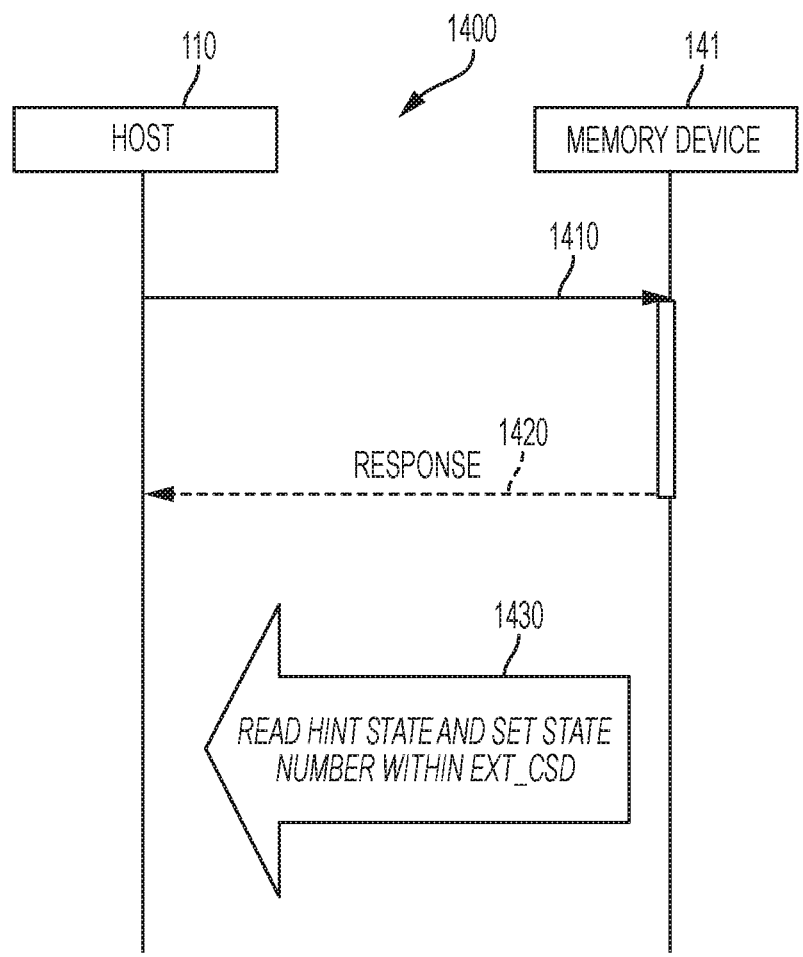

Referring specifically to FIG. 14, reading the KISS current state register to receive information related to the current state and/or the hint state is described. In some embodiments, the entire KISS current state register (i.e., both the current state and the hint state) may be read. At operation 1410, the host 110 may send a read current set state register command (e.g., CMD8 for eMMC) to the memory device 120. At operation 1420, the memory device 120 may send an acknowledgement indicating that the memory device 120 received the start execution command for the read current state register operation and is ready to perform the operation. At operation 1430, the memory device 120 may send a hint state and/or set state associated with the selected known state. Thus, the memory device 120 may send the state of the KISS current state register to the host, which may include both the hint state and the set state in some embodiments.

Some embodiments include an electronic system comprising a host device, and a memory device operably coupled with the host device. The memory device is configured to detect a known state supported by the memory device from among a set of known states stored and defined in registers of the memory device, and build the memory device prior to executing at least some of the individual operations from the host device associated with the detected known state.

Figure 15:
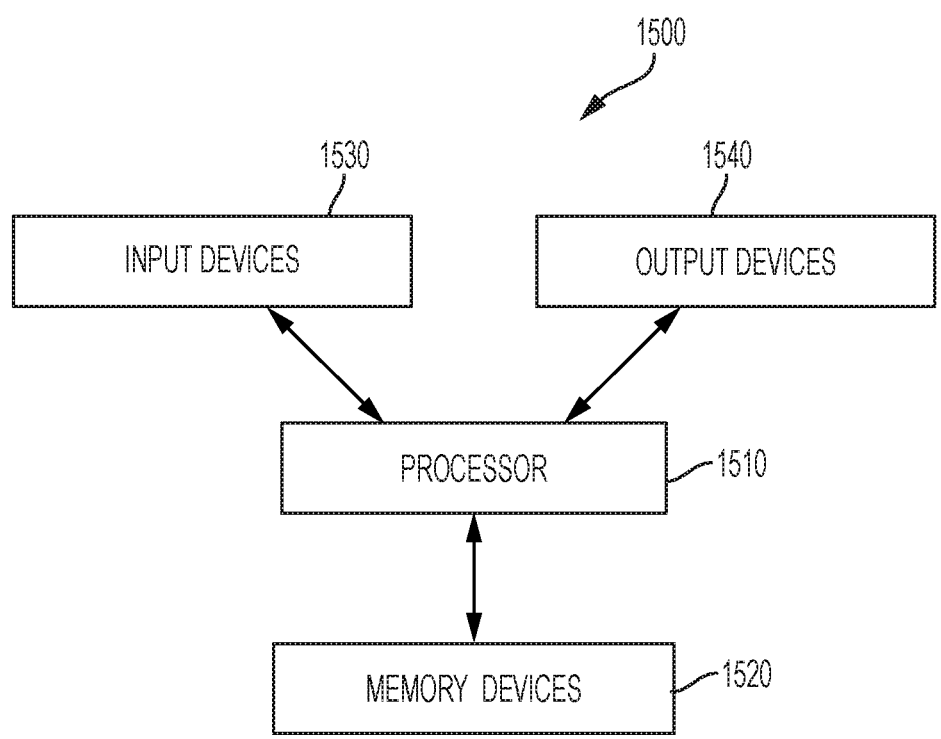
FIG. 15 is a schematic block diagram of an electronic system according to an embodiment of the present disclosure.

FIG. 15 is a schematic block diagram of an electronic system 1500 according to an embodiment of the present disclosure. The electronic system 1500 includes a processor 1510 operably coupled with a memory device 1520, one or more input devices 1530 and one or more output devices 1540. The electronic system 1500 may be a consumer electronic device, such as a desktop computer, a laptop computer, a tablet computer, an electronic reader, a smart phone or other type of communication device, as well as any type of computing system incorporating non-volatile storage. As discussed above, the memory device 1520 may be configured to support the KISS functionality as discussed above. The processor 1510 may be the host that is configured according to the description above.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalents.

What is claimed is:

1. A memory device, comprising:
   a memory array having non-volatile memory cells; and
   a memory controller operably coupled to the memory array, the memory controller configured to:
   create and store one or more known states in the memory device by operating a learning phase during which the memory device defines a new state based on analyzing traffic received from a host to perform one or more operations associated with the new state;
   detect a known state to enter based, at least in part, on recognizing at least one of an explicit request to enter the known state or a trigger implicit from analyzing traffic received from the host during communication with the host that is different than the explicit request to enter the known state; and
   reconfigure the memory device to prepare for the known state responsive to the explicit request or the trigger being recognized by the memory controller.

2. The memory device of claim 1, wherein the memory controller is configured to detect another known state and reconfigure to the memory device to prepare for the another known state at another instance.

3. The memory device of claim 1, wherein the known state is responsive to initiating boot up.

4. The memory device of claim 1, wherein the memory controller includes one or more memory controller registers that store information corresponding to the known state.

5. The memory device of claim 4, wherein the one or more memory controller registers include a capability register configured to inform the host of a number of known states supported by the memory device.

6. The memory device of claim 4, wherein the one or more memory controller registers include an execution register configured to be used to store definitions for specific known states supported by the memory device.

7. The memory device of claim 6, wherein the execution register is further configured to be written to responsive to the host creating at least one new known state.

8. The memory device of claim 1, wherein the non-volatile memory cells of the memory array are configured as at least one of NAND Flash, NOR Flash, erasable programmable read only memory (EPROM), electrically erasable programmable read only memory (EEPROM), ferroelectric RAM (FRAM), or magnetoresistive RAM (MRAM).

9. The memory device of claim 1, wherein the trigger is a pattern of commands in the traffic received from a host.

10. The memory device of claim 1, wherein the trigger is a pattern in the data in the traffic received from a host.

11. A host device, comprising:
    a host controller configured to:
    communicate with a memory device that supports a feature and protocol for detecting a known state for operation of the memory device;
    create and store one or more known states in the memory device by operating a learning phase during which the memory device defines a new state via a traffic analyzer analyzing traffic of the host controller to perform one or more operations associated with the new state;
    detect a known state of a memory device via the traffic analyzer of the host controller based on its own traffic or internal operations; and
    sending an explicit command instructing the memory device to enter into the known state and reconfiguring the memory device to prepare for operations prior to the memory device entering the known state.

12. The host device of claim 11, wherein the host controller and the memory device are configured to communicate using a communication protocol selected from the group consisting of an embedded multi-media controller (eMMC) protocol, a Universal Flash Storage (UFS) protocol, and a solid state drive (SSD) protocol.

13. The host device of claim 11, wherein the host device includes a processor of an electronic system.

14. The host device of claim 11, wherein the trigger is responsive to a user input to open a particular application program executed by the host device and prior to usage operations being performed by the particular application program.

15. A method for managing operation of a memory device, the method comprising:
    receiving communication over a command and data bus from a host device;
    determining a known state for the memory device responsive to recognizing at least one of an explicit request from the host device to enter the known state or a trigger implicit from traffic received during the communication that is different than the explicit request from the host device to enter the known state;
    reconfiguring the memory device according to the known state responsive to recognizing the trigger and prior to receiving individual commands from the host device; and
    creating known states for storage in one or more registers of the memory device from which the determined known state is selected including operating a learning phase during which the memory device defines a new state based on analyzing traffic received from the host device to perform one or more operations associated with the new state, and storing the new state in the one or more registers of the memory device.

16. The method of claim 15, wherein receiving communication from the host device includes:
    receiving a command having an explicit instruction to enter another known state at another instance; and
    reconfiguring the memory device according to the another known state responsive to the command received from the host device.

17. The method of claim 15, wherein reconfiguring the memory device includes at least one of preloading tables and information into internal RAM memories, aggregating data, enabling or disabling internal circuitry of a memory controller, enabling or disabling internal circuitry of a memory array, presetting internal microcontroller registers, or clearing space in the memory array to receive expected data during operations of the determined known state.

18. The method of claim 15, wherein creating known states further includes operating a pushing phase during which the memory device defines a new state based on information received from the host device that defines unique characteristics associated with the new state, and storing the new state in the one or more registers of the memory device.

19. The method of claim 15, wherein determining the known state includes analyzing the communication from the host device including at least one of detecting peaks of IO accesses triggered by a given precise and repeatable user operation, detecting repetitive IO access patterns onto the memory device, or detecting predictable peak instants for accessing the memory device.

20. An electronic system, comprising:
a host device; and
a memory device operably coupled with the host device, the memory device configured to:
create and store one or more known states stored and defined in registers of the memory by operating a learning phase during which the memory device defines a new state based on analyzing traffic received from the host device to perform one or more operations associated with the new state;
detect a known state supported by the memory device from among a set of the one or more known states stored and defined in registers of the memory device responsive to recognizing a trigger implicit from analyzing traffic received from the host device during communication with the host that is different than an explicit request to enter the known state; and
build the memory device responsive to the trigger being recognized and prior to executing at least some of the individual operations from the host device associated with the detected known state.

21. The electronic system of claim 20, further comprising at least one of an embedded multi-media controller (eMMC), a Solid State Drive (SSD), or a Universal Flash Storage (UFS) devices that includes the memory device.

22. The electronic system of claim 20, further comprising a processor, input devices, and output devices.

23. The electronic system of claim 22, wherein the processor is the host device.

* * * * *